M. Zabel,
Car Ventilator.

Nº 55,757.      Patented June 19, 1866.

Witnesses:
E. Schumacher
G. W. Mygatt

Inventor:
Max Zabel

UNITED STATES PATENT OFFICE.

MAX ZABEL, OF MILWAUKEE, WISCONSIN.

MODE OF FASTENING VENTILATORS IN PLACE.

Specification forming part of Letters Patent No. 55,757, dated June 19, 1866.

*To all whom it may concern:*

Be it known that I, MAX ZABEL, of the city and county of Milwaukee, State of Wisconsin, have invented a new and Improved Mode in Fastening Air-Ventilators in Place; and I do hereby declare that the following is a full and exact description thereof, reference being had to the accompanying drawings and to the letters of reference marked thereon.

My invention relates to the affixing or attaching of air ventilators or registers in the holes or spaces arranged for them in cars, &c., and has special reference to the so constructing and adapting of such ventilators or registers as to allow of their ready and easy attachability or detachability for any purpose whatever.

Figure 1:
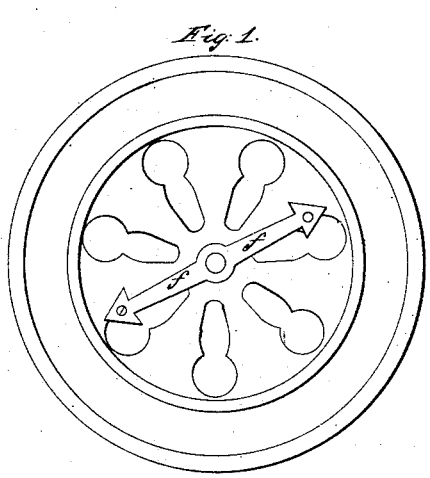
Figure 4:
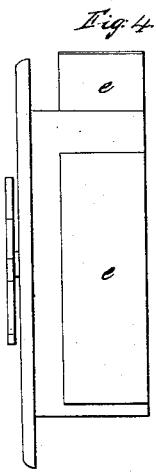
Figure 2:
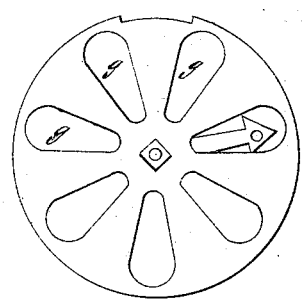
Figure 3:
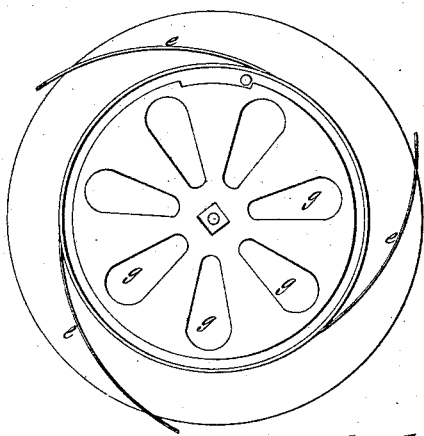

Figure 1, letter A, is the front view of ventilator, showing openings for circulation of air; Fig. 2, letter B, the valve to open or close the openings for ventilation; Fig. 3, letter C, reverse of front, and showing openings for ventilation; Fig. 4, letter D, section of ventilator, showing lever and spring—the spring used in securing ventilator in place, the lever used in controlling valve regulating openings in ventilator.

Letters e e e show springs secured to rim of ventilator and fastening the same in place, as desired; letter f, lever moving valve B, and controlling openings for circulation of air; Letters g g g g, &c., openings for air.

I do not claim any part of the ventilator, knowing the same has been before known and used; but I do claim and desire to secure by Letters Patent—

The springs e e e, securing the ventilator in place, when arranged and applied as shown and set forth.

MAX ZABEL.

Witnesses:
  G. W. MYGATT,
  E. SCHUMACHER.